United States Patent
Tian et al.

(10) Patent No.: US 9,521,583 B2
(45) Date of Patent: Dec. 13, 2016

(54) METHOD AND DEVICE FOR IMPLEMENTING LOAD BALANCING

(71) Applicant: ZTE Corporation, Shenzhen, Guangdong (CN)

(72) Inventors: Chao Tian, Shenzhen (CN); Mingquan Gao, Shenzhen (CN); Minru Shao, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 28 days.

(21) Appl. No.: 14/408,730

(22) PCT Filed: Jun. 21, 2013

(86) PCT No.: PCT/CN2013/077724
§ 371 (c)(1),
(2) Date: Dec. 17, 2014

(87) PCT Pub. No.: WO2014/000608
PCT Pub. Date: Jan. 3, 2014

(65) Prior Publication Data
US 2015/0181466 A1 Jun. 25, 2015

(30) Foreign Application Priority Data

Jun. 27, 2012 (CN) .......................... 2012 1 0214534

(51) Int. Cl.
*H04B 7/00* (2006.01)
*H04W 28/08* (2009.01)
*H04W 72/04* (2009.01)

(52) U.S. Cl.
CPC ......... *H04W 28/08* (2013.01); *H04W 72/0426* (2013.01); *H04W 72/0486* (2013.01)

(58) Field of Classification Search
CPC ..... H04W 76/02; H04W 76/04; H04W 76/045
(Continued)

(56) References Cited

U.S. PATENT DOCUMENTS 8,315,163 B2 * 11/2012 Xu .................... H04W 28/08 370/230
2005/0208950 A1 * 9/2005 Hasse ................ H04L 47/125 455/453

(Continued)

FOREIGN PATENT DOCUMENTS

CN 101282304 A 10/2008
CN 102869047 A 1/2013

OTHER PUBLICATIONS

Study on load balancing of IEEE 802.11 bandwidth WLANs, mailed on Jul. 2008.

(Continued)

*Primary Examiner* — Dmitry H Levitan
(74) *Attorney, Agent, or Firm* — Oppedahl Patent Law Firm LLC (57) ABSTRACT

Disclosed are a method and device for implementing load balancing, when a first Access Point (AP) is to transmit data of a Station (STA) accessing the first AP, the first AP determines other APs for load sharing and transmits data desired to be offloaded to said other APs. Technical solutions for implementing load balancing according to the present disclosure can offload data of an STA to one or more APs and transmit the data to the Internet by virtue of other APs of a same ESS when conditions of a wireless network where a wireless AP of a MiFi or Eufi type is located is relatively poor or a load of the wireless AP is relatively heavy. Therefore, when too many STAs access the wireless AP, cases will not arise that the load of the wireless AP is too heavy or a 3G/4G network where the wireless AP is located experiences deterioration of its conditions or even an decrease in its performance. In addition, the load balancing can effectively improve user experiences for STAs to use a (Continued)

wireless network while improving utilization rate of wireless APs of the same ESS.

10 Claims, 4 Drawing Sheets

(58) Field of Classification Search
USPC ........ 370/310, 312, 328, 329, 431, 432, 437
See application file for complete search history.

(56) References Cited

U.S. PATENT DOCUMENTS

| | | | |
|---|---|---|---|
| 2006/0293060 A1* | 12/2006 | Yang ..................... | H04W 36/22 455/453 |
| 2008/0096575 A1* | 4/2008 | Aragon ................. | H04W 36/22 455/453 |
| 2008/0123529 A1* | 5/2008 | Lee ....................... | H04W 28/08 370/235 |
| 2008/0170497 A1* | 7/2008 | Jeong .................... | H04W 28/08 370/230 |
| 2009/0290493 A1 | 11/2009 | Xu | |
| 2013/0176988 A1* | 7/2013 | Wang .................... | H04W 28/08 370/331 |

OTHER PUBLICATIONS

International Search Report in international application No. PCT/CN2013/077724, mailed on Oct. 10, 2013.
English Translation of the Written Opinion of the International Search Authority in international application No. PCT/CN2013/077724, mailed on Oct. 10, 2013.
Research on load balancing optimization in wireless local area network, Jul. 15, 2010.

* cited by examiner

METHOD AND DEVICE FOR IMPLEMENTING LOAD BALANCING

TECHNICAL FIELD

The present disclosure relates to the field of communication, and in particular to a method and device for implementing load balancing.

BACKGROUND

As the development of 3G/4G mobile communication networks, MiFi and EuFi products become increasingly popular among users since they have good mobility and low networking cost as well as wireless network data capability and WiFi capability, thus meeting demand on LAN networking for personal users and small sized enterprise users.

However, bandwidths of MiFi and EuFi products (hereafter referred to as a wireless Access Point (AP)) accessing the Internet through 3G/4G are still not comparable with those of traditional wired networks; on the other hand, influenced by status of a mobile network itself, a bandwidth resulted by way of wirelessly accessing the Internet have great differences with a bandwidth within a WLAN.

At present when a small sized enterprise sets up an LAN by using wireless AP products, multiple wireless APs will be arranged in a same area to meet requirements of accessing the LAN by multiple users. All existing solutions for AP load balancing don't take into account a real-time load of a wireless AP, the wireless AP receives data transmitted by all Stations (STAs) accessing the wireless AP and interacts with the Internet, and it needs to complete all data transmission even though its current wireless network status deteriorates or all data transmission loads of the wireless AP are already heavy enough.

It can be seen that existing techniques regarding load balancing of a wireless AP have below apparent disadvantages:

1. all existing solutions for AP load balancing are focused on an access control stage, they can reject new users to access but can't solve problems in load balancing when a wireless AP has excessively heavy loads caused by users accessing it;

2. A wireless AP access the Internet by using a 3G/4G mobile network, thus a demand for STAs to use the network can't be ensured when the mobile network where the wireless AP is located deteriorates.

SUMMARY

In view of the above, the present disclosure is intended to provide a method and device for implementing load balancing so as to solve problems in load balancing when a wireless AP has excessively heavy loads caused by users accessing it.

To this end, the technical solutions of the present disclosure are implemented as follows.

A method for implementing load balancing includes:

when a first Access Point (AP) is to transmit data of a Station (STA) accessing the first AP, the first AP determines other APs for load sharing and transmits data desired to be offloaded to said other APs.

In an embodiment, before determining other APs for load sharing, the first AP may further determine whether itself is overloaded.

In an embodiment, the determining by the first AP whether itself is overloaded may include:

way 1, the first AP receives Beacon frames of said other APs, extracts loads thereof and determines accordingly whether itself is overloaded;

way 2, the first AP broadcasts a load balancing request to said other APs, receives messages responded by said other APs to the load balancing request and determines accordingly whether itself is overloaded.

In an embodiment, the method may further include:

in way 1, a load of a wireless AP is added into a standard Beacon frame so as to be broadcasted by being added into a Frame Body field of the standard Beacon frame;

in way 2, a Sub Type field of the standard Beacon frame is reconstructed to form a special frame for broadcasting a load balancing request of the wireless AP, a wireless AP receiving a reconstructed Beacon frame parses the reconstructed Beacon frame and returns a message responded to the load balancing request according to a structure of the reconstructed Beacon frame.

In an embodiment, the method may further include:

a Frame Control field of the standard Beacon frame is reconstructed and it is determined from a type of the Frame Control field that the Beacon frame is a management frame; and load information of the wireless AP is packaged into the Frame Body field.

In an embodiment, the loads may be a degree of deterioration of 3G/4G networks, including an occupancy rate of a maximum bandwidth, a degree of traffic limitation and a degree of stability of a 3G/4G network where the first AP is located during data transmission;

when it is determined according to the loads whether the first AP is overloaded, a load of the first AP may be calculated by taking into account three factors including a bandwidth occupancy rate, the degree of traffic limitation and the degree of stability of the 3G/4G network where the first AP is located during data transmission.

In an embodiment, when the three factors are taken into account, a hierarchical evaluation mode or weighting operation may be used.

In an embodiment, the determining other APs for load sharing may include:

for way 1, the first AP sorts Beacon frames transmitted by all detectable other APs and selects accordingly one or more APs with low loads as said other APs for load sharing;

for way 2, the first AP sorts loads corresponding to all received messages responded to the load balancing request and selects accordingly one or more APs with low loads as said other APs for load sharing.

In an embodiment, when the first AP transmits data desired to be offloaded to said other APs, the first AP receives data transmitted by the STA, stores received data to a local cache region, packages the received data into packets and transmits packets desired to be offloaded to said other APs.

In an embodiment, when the packaging is implemented, entire data may be transmitted through fragmentation or as a whole.

A device for implementing load balancing includes a control module, a load calculation module, a parsing module and a transmission/reception module, wherein the control module is configured to control the load calculation module and the parsing module to determine other APs for load sharing when a first AP is to transmit data of an STA accessing the first AP; and the transmission/reception module is configured to transmit data desired to be offloaded to said other APs.

In an embodiment, the control module may be configured to further determine whether itself is overloaded before determining said other APs for load sharing.

In an embodiment, when determining whether the first AP is overloaded, the control module may be configured to:

in way 1, receive Beacon frames of said other APs, control the parsing module to extract loads thereof and determine accordingly whether the first AP is overloaded;

in way 2, broadcast a load balancing request to said other APs, receive messages responded by said other APs to the load balancing request and determine accordingly whether the first AP is overloaded.

In an embodiment, the control module may be further configured to:

in way 1, add a load of a wireless AP into a standard Beacon frame so as to be broadcasted by adding the load of the wireless AP into a Frame Body field of the standard Beacon frame;

in way 2, reconstruct a Sub Type field of the standard Beacon frame to form a special frame for broadcasting a load balancing request of the wireless AP, and control the parsing module to parse a reconstructed Beacon frame after the reconstructed Beacon frame is received and return a message responded to the load balancing request according to a structure of the reconstructed Beacon frame.

In an embodiment, the control module may be further configured to:

reconstruct a Frame Control field of the standard Beacon frame and determine from a type of the Frame Control field that the Beacon frame is a management frame; and package load information of the wireless AP into the Frame Body field.

In an embodiment, the loads may be a degree of deterioration of 3G/4G networks, including an occupancy rate of a maximum bandwidth, a degree of traffic limitation and a degree of stability of a 3G/4G network where the first AP is located during data transmission;

when determining according to the loads whether the first AP is overloaded, the control module is configured to calculate a load of the first AP by taking into account three factors including a bandwidth occupancy rate, the degree of traffic limitation and the degree of stability of the 3G/4G network where the first AP is located during data transmission.

In an embodiment, when the three factors are taken into account, the control module may be configured to use a hierarchical evaluation mode or weighting operation.

In an embodiment, when determining said other APs for load sharing, the control module may be configured to:

for way 1, sort Beacon frames transmitted by all detectable other APs and select accordingly one or more APs with low loads as said other APs for load sharing;

for way 2, sort loads corresponding to all received messages responded to the load balancing request and select accordingly one or more APs with low loads as said other APs for load sharing.

In an embodiment, the device may further include a caching module and a packaging module, wherein when the data desired to be offloaded is transmitted to said other APs, the caching module is configured to store received data transmitted by the STA to a local cache region; and the packaging module is configured to package cached data into packets and transmit packets desired to be offloaded to said other APs.

In an embodiment, when the packaging is implemented, entire data may be transmitted through fragmentation or as a whole.

Technical solutions for implementing load balancing according to the present disclosure can offload data of an STA to one or more APs and transmit the data to the Internet by virtue of other APs of a same Extended Service Set (ESS) when conditions of a wireless network where a wireless AP of a MiFi or Eufi type is located is relatively poor or a load of the wireless AP is relatively heavy. Therefore, when too many STAs access the wireless AP, cases will not arise that the load of the wireless AP is too heavy or a 3G/4G network where the wireless AP is located experiences deterioration of its conditions or even an decrease in its performance. In addition, the load balancing can effectively improve user experiences for STAs to use a wireless network while improving utilization rate of wireless APs of the same ESS.

DETAILED DESCRIPTION

In a wireless network consisting of wireless APs, below steps can be implemented:

step 1, a wireless AP (AP1) of a wireless LAN receives a data transmission request of an STA accessing the AP, and a control module of AP1 requests a load calculation module to query a current load of AP1;

the current load of AP1 refers to current conditions of a 3G/4G network through which AP1 accesses the Internet, i.e., a degree of deterioration of a wireless network where AP1 is located.

step 2, the load calculation module calculates the load of AP1 and returns it to the control module;

step 3, the control module determines according to the current load whether it is desired to initiate a load balancing request to other APs, if other APs are not desired to join in the load balancing, proceed to step 4, otherwise proceed to step 5;

step 4, AP1 accepts the data transmission request of the STA, completes interaction with the Internet, and the load balancing process ends;

step 5, AP1 searches in a Extended Service Set (ESS) for an AP that can be used for load sharing (AP2);

step 6, AP1 caches locally data to be transmitted by the STA and repackage cached data;

step 7, AP1 transmits packets desired to be offloaded by AP2 to AP2;

step 8, AP2 transmits received data desired to be offloaded to the Internet through a 3G/4G network.

above steps can be performed by a device for implementing load balancing, the device may be applied to a wireless network consisting of wireless APs, and the device includes:

a control module configured to perform control functionality during a whole load balancing process, such as querying a calculation module for loads, receiving feedbacks and implementing coordination and interaction with other modules in the device;

a load calculation module configured to calculate a current load of a wireless AP;

a transmission/reception module configured to authenticate information and implement data transmission/reception between a wireless AP and an STA or other APs;

a parsing module configured to parse messages regarding load balancing transmitted by other wireless AP;

a caching module configured to cache locally data transmitted by the STA;

a packaging module configured to repackage data desired to be load balanced so as to meet format requirements that repackaged data can be transmitted respectively by multiple APs.

Specific embodiments of the present disclosure will be further elaborated below with reference to the drawings.

Figure 1:
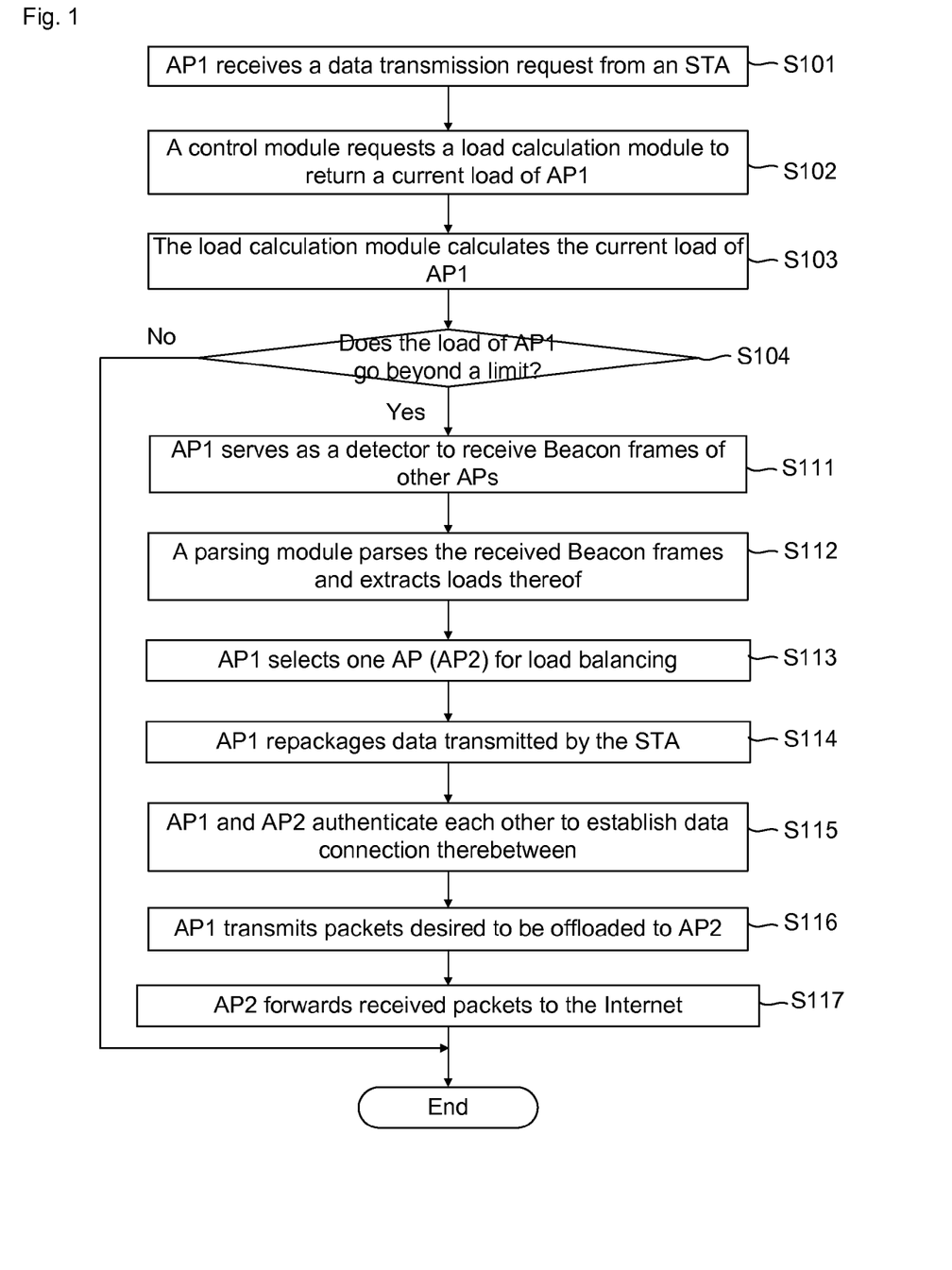
FIG. 1 is a flow chart of a method for implementing load balancing of a wireless AP according to embodiment 1 of the present disclosure.

Referring to FIG. 1 which is a flow chart of a method for implementing load balancing of a wireless AP according to embodiment 1 of the present disclosure, and the process includes the following steps:

S101, AP1 receives a data transmission request from an STA;

S102, a control module in AP1 requests a load calculation module to return a current load of AP1;

S103, the load calculation module calculates the current load of AP1 and returns a calculated load to the control module;

S104, the control module determines whether the load of AP1 goes beyond a limit, if the load of AP1 doesn't go beyond the limit, the current load balancing process ends; otherwise, proceed to S111;

preferably, the loading going beyond a limit refers to a current load exceeds a predetermined threshold, which results in a case that a current wireless AP can't support additional data transmission any more.

Figure 4:
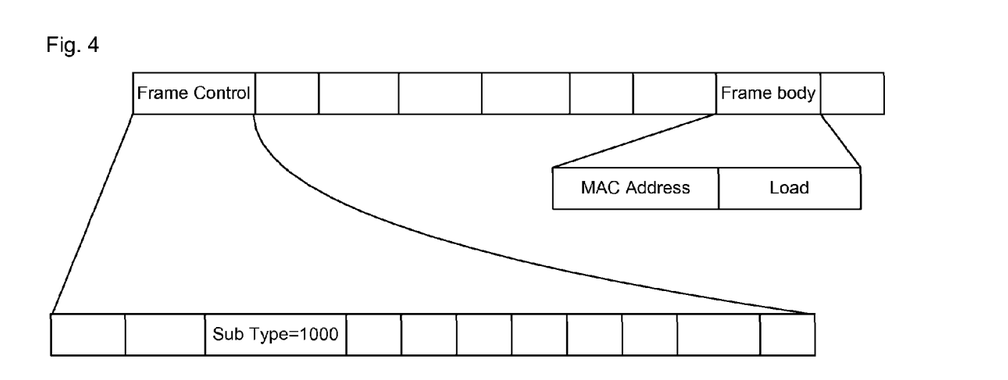
FIG. 4 is a schematic structural diagram of a frame for broadcasting a load in embodiment 1 of the present disclosure.

S111, AP1 receives Beacon frames of other APs in an ESS extension and transmits received Beacon frames to a parsing module for parsing;

S112, AP1 parses the received Beacon frames and extracts loads thereof;

preferably, a standard Beacon frame is redefined in the embodiment, as shown in FIG. 4, a load of a wireless AP is added a standard Beacon frame so as to be broadcasted by being added into a Frame Body field of the standard Beacon frame.

Frame Control field: a Frame Control field of a standard frame is reconstructed, and it can be seen from Type=00 of the field that the frame belongs to a management frame;

Sub Type: 1000 represents a Beacon frame.

Frame Body field: a Frame Body field is a data field of a frame, load information (including MAC address, Load) of a wireless AP is packaged into the Frame Body field in the embodiment.

S113, AP1 sorts Beacon values of Beacon frames transmitted by all detectable other APs and selects accordingly one AP with a lowest load (herein referred to as AP2) as said an object of load balancing;

S114, AP1 receives data transmitted by the STA, stores received data to a local cache region and packages stored data into packets;

preferably, when data are packaged in the embodiment, entire data is transmitted through fragmentation or as a whole. The fragmentation refers to: when AP1 considers APs that can currently join in load balancing are more than one and a file desired to be transmitted is relative large, then data can be transmitted through fragmentation, i.e., transmitted respectively to different APs so as to implement load balancing; otherwise, data only needs to be transmitted to one AP so as to implement load balancing.

S115, AP1 and AP2 authenticate each other to establish data connection therebetween;

herein the authentication may be mandatory so as to avoid data attacks from rogue APs;

S116, AP1 transmits packets desired to be offloaded to AP2;

S117, AP2 transmits received packets to the Internet according to a specified address.

Figure 2:
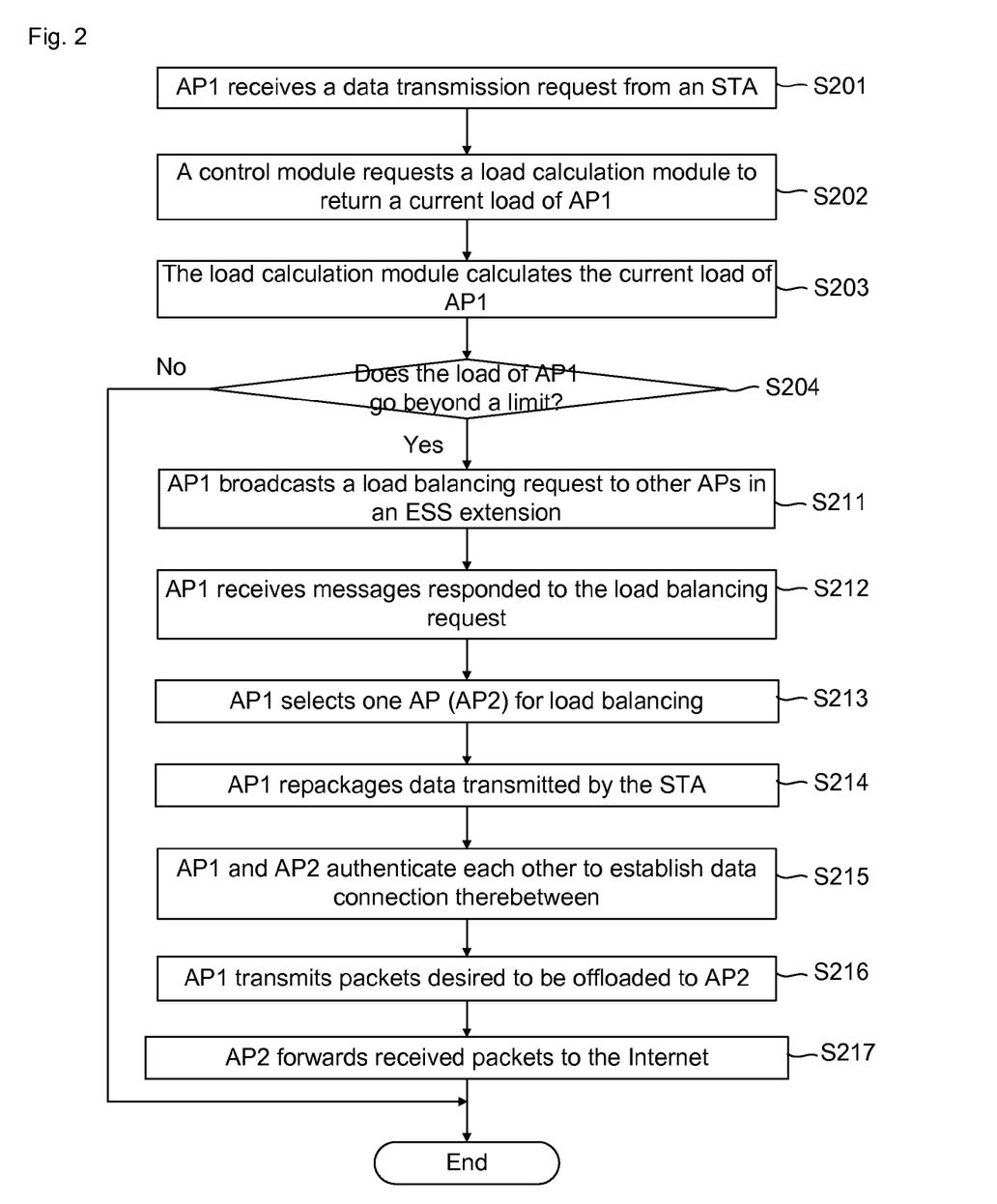
FIG. 2 is a flow chart of a method for implementing load balancing of a wireless AP according to embodiment 2 of the present disclosure.

Referring to FIG. 2 which is a flow chart of a method for implementing load balancing of a wireless AP according to embodiment 2 of the present disclosure, and the process includes the following steps:

S201, AP1 receives a data transmission request from an STA;

S202, a control module in AP1 requests a load calculation module to return a current load of AP1;

S203, the load calculation module calculates the current load of AP1 and returns a calculated load to the control module;

S204, the control module determines whether the load of AP1 goes beyond a limit, if the load of AP1 doesn't go beyond the limit, the current load balancing process ends; otherwise, proceed to S111;

preferably, the loading going beyond a limit refers to a current load exceeds a predetermined threshold, which results in a case that a current wireless AP can't support additional data transmission any more.

Figure 5:
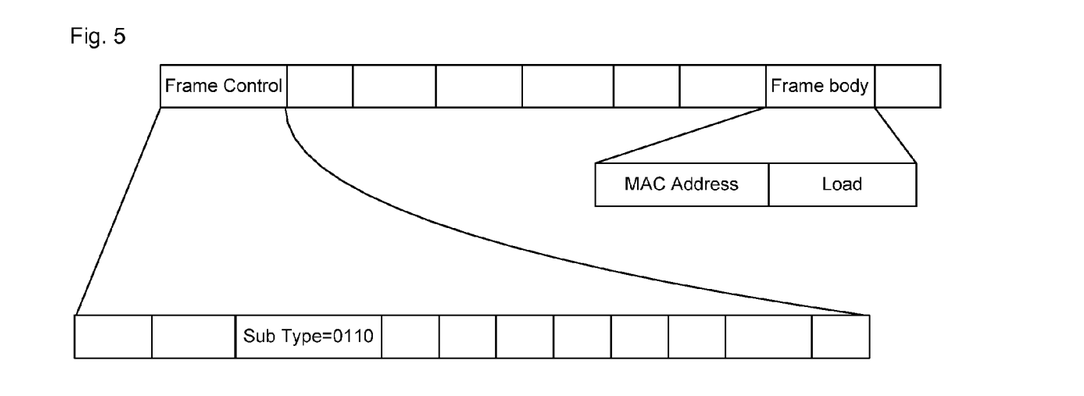
FIG. 5 is a schematic structural diagram of a frame for transmitting a load balancing request and returning a message responded to the load balancing request in embodiment 2 of the present disclosure.

S211, AP1 broadcasts a load balancing request to other APs in an ESS extension;

preferably, the load balancing request of the embodiment is transmitted through a control frame. As shown in FIG. 5, a standard control frame is modified in the embodiment.

Frame Control field: the Frame Control field of the standard frame is reconstructed, and it can be seen from Type=00 of the field that the frame belongs to a management frame;

Sub Type: a Sub Type field of the standard Beacon frame is reconstructed to form a special frame of the embodiment for broadcasting a load balancing request of the wireless AP, a wireless AP receiving a reconstructed Beacon frame can also parse the reconstructed Beacon frame and returns a message responded to the load balancing request according to a structure of the reconstructed Beacon frame.

Preferably, the Sub Type is assigned a value of 0110. Since in a standard protocol, values of Sub Type of a management frame namely 0110 to 0111 and 1101 to 1111 are not defined, herein one of these values is used. A new value is defined for the Sub Type so as to be differentiated from other standard values.

Frame Body field: a Frame Body field is a data field of a frame, load information (including MAC address, Load) of a wireless AP is packaged into the Frame Body field in the embodiment.

It should be noted that when the control frame is transmitted as a request frame, the Load field can be set to −1 to represent it is a load balancing request message; when the control frame is regarded as a message responded to the load balancing request, the Load field is set to a practical load.

It should be noted that only fields related to the present disclosure are indicated in FIG. 4 and FIG. 5, all other fields existing in the prior art are not shown.

S212, AP1 receives messages responded by other APs to the load balancing request in a valid time;

preferably, when other APs receive the load balancing request of AP1, they calculate their own loads and transmit the loads to AP1 through a control frame within the valid time, and a structure of the control frame is as shown in FIG. 5.

S213, loads corresponding to all received messages responded to the load balancing request are sorted and one AP with a lowest load (herein referred to as AP2) is selected accordingly as an object of load balancing.

S214, AP1 receives data transmitted by the STA, stores received data to a local cache region and packages stored data;

preferably, when data are packaged in the embodiment, entire data is transmitted through fragmentation or as a whole. The fragmentation refers to: when AP1 considers APs that can currently join in load balancing are more than one and a file desired to be transmitted is relative large, then data can be transmitted through fragmentation, i.e., transmitted respectively to different APs so as to implement load balancing; otherwise, data only needs to be transmitted to one AP so as to implement load balancing.

S215, AP1 and AP2 authenticate each other to establish data connection therebetween;

herein the authentication is mandatory in the embodiment so as to avoid data attacks from rogue APs;

S216, AP1 transmits packets desired to be offloaded to AP2;

S217, AP2 transmits received packets to the Internet according to a specified address.

In the implementation of above S103 and S203, the load can be preferably defined as a degree of deterioration of a 3G/4G network. The degree of deterioration of the network refers to an occupancy rate of a maximum bandwidth, a degree of traffic limitation and a degree of stability of a 3G/4G network where a current AP is located during data transmission.

Preferably, when a load of a wireless AP is calculated, three factors can be taken into account that include a bandwidth occupancy rate, the degree of traffic limitation and the degree of stability of the 3G/4G network where the current wireless AP is located during data transmission. The three factors are described in detail as below:

1) the bandwidth occupancy rate refers to a ratio between an occupied bandwidth and a maximum bandwidth;

2) the degree of traffic limitation refers to a ratio between used traffic by an SIM card and a maximum traffic, for example if a traffic package in a current month for the SIM card is 2G and 1.5G is used so far, the used traffic so far accounts for 75%; compared to an SIM card having a monthly traffic package of 2G and with 0.5G thereof used, the former has a high degree of traffic limitation;

3) the degree of stability of the 3G/4G network during data transmission refers to whether current network conditions of a wireless AP is good. This index can be calculated through detecting a current data loss rate, when the loss rate is larger than a specific value, it can be considered that the current network conditions is poor. The reason for setting this index lies in that when networks used by wireless APs of an ESS extension belong to different operators and conditions of one network provided by one certain operator is poor, wireless APs having good network conditions can be used to balance the load.

The above three indexes are evaluated in a hierarchical evaluation mode, i.e., priority is given to index 3, then index 1 and then index 2; other hierarchical evaluation mode can also be used according to practical circumstances; in addition, the above three indexes can be synthetically considered, i.e., a weighting operation is performed, which calculates the load by setting different weights to the three indexes and then summing them.

It should be noted that one or more APs may be selected for implementing load balancing. A method with multiple APs selected has a same principle as the method with one AP selected, and the only difference lies in that one AP is replaced by multiple APs.

Figure 3:
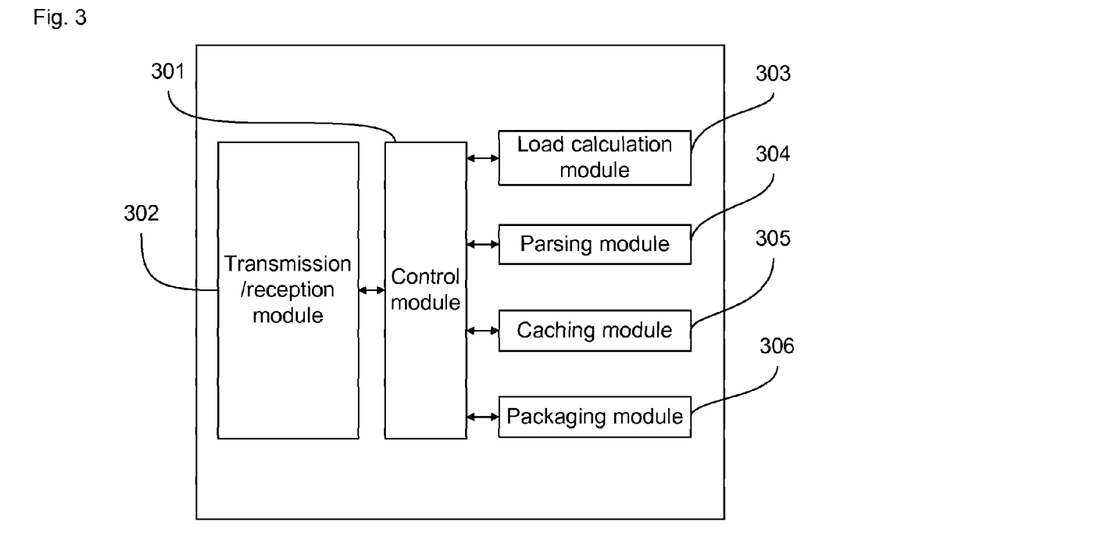
FIG. 3 is a schematic diagram of a device for implementing load balancing according to an embodiment of the present disclosure.

Referring to FIG. 3 which is a schematic diagram of a device for implementing load balancing according to an embodiment of the present disclosure, the device includes:

a control module configured to perform control functionality during a whole load balancing process, such as querying a calculation module for loads, receiving feedbacks and implementing coordination and interaction with other modules in the device;

a load calculation module configured to calculate a current load of a wireless AP; preferably, the load is defined as a degree of deterioration of a 3G/4G network. The degree of deterioration of the network refers to an occupancy rate of a maximum bandwidth, a degree of traffic limitation and a degree of stability of a 3G/4G network where a current AP is located during data transmission;

a transmission/reception module configured to authenticate information and implement data transmission/reception between a wireless AP and an STA or other APs;

a parsing module configured to parse messages regarding load balancing transmitted by other wireless AP;

a caching module configured to cache locally data transmitted by the STA;

a packaging module configured to repackage data desired to be balanced so as to meet format requirements that repackaged data can be transmitted respectively by multiple APs. Preferably, when data are packaged, entire data is transmitted through fragmentation or as a whole. The fragmentation refers to: when an AP considers APs that can currently join in load balancing are more than one and a file desired to be transmitted is relative large, then data can be transmitted through fragmentation, i.e., transmitted respectively to different APs so as to implement load balancing; otherwise, data only needs to be transmitted to one AP so as to implement load balancing.

The device shown in FIG. 3 can be arranged in a functional entity such as an AP.

Figure 6:
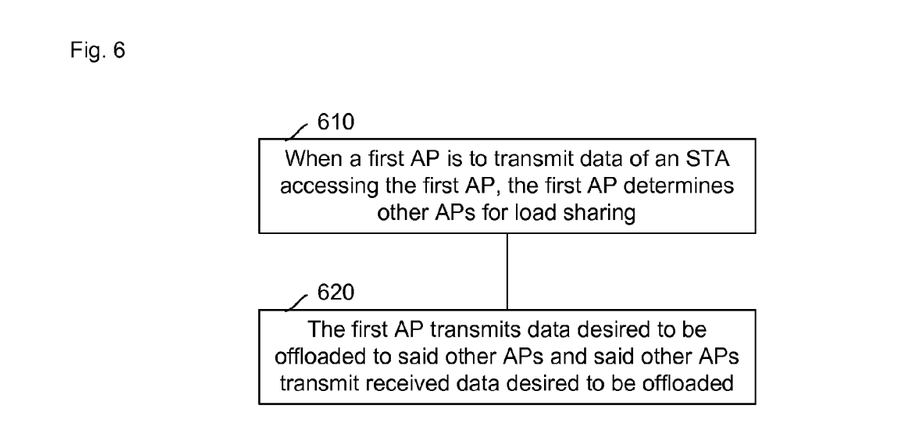
FIG. 6 is a simplified flow chart of a method for implementing load balancing according to an embodiment of the present disclosure.

It can be seen from above description that an AP that desires load sharing is referred to as a first AP, the idea of an load balancing operation implemented in the present disclosure can be shown in FIG. 6, and the process therein includes the following steps:

step 610, when a first AP is to transmit data of an STA accessing the first AP, the first AP determines other APs for load sharing.

Step 620, the first AP transmits data desired to be offloaded to said other APs and said other APs transmit received data desired to be offloaded.

Regardless of the method or device described above, it can be seen that technical solutions for implementing load balancing according to the present disclosure can offload data of an STA to one or more APs and transmit the data to the Internet by virtue of other APs of a same Extended Service Set (ESS) when conditions of a wireless network where a wireless AP of a MiFi or Eufi type is located is relatively poor or a load of the wireless AP is relatively heavy. Therefore, when too many STAs access the wireless AP, cases will not arise that the load of the wireless AP is too heavy or a 3G/4G network where the wireless AP is located experiences deterioration of its conditions or even an decrease in its performance. In addition, the load balancing can effectively improve user experiences for STAs to use a wireless network while improving utilization rate of wireless APs of the same ESS.

What described are merely preferable embodiments of the present disclosure, and are not intended to limit the present disclosure.

The invention claimed is:

1. A method for implementing load balancing, comprising:
   when a first Access Point (AP) is to transmit data received from a Station (STA) which has accessed the first AP, determining whether itself is overloaded;
   determining, by the first AP, other APs for load sharing when determining that itself is overloaded; and
   offloading, by the first AP, the received data to said other APs;
   wherein the determining by the first AP other APs for load sharing comprises:
   way 1, receiving, by the first AP, Beacon frames of said other APs, extracting loads of said other APs in Beacon frames; or
   way 2, broadcasting, by the first AP, a load balancing request to said other APs, and receiving load balancing responses by said other APs;
   wherein the method further comprising:
   in way 1, adding a load of a wireless AP into a standard Beacon frame so as to be broadcasted by adding the load of the wireless AP into a Frame Body field of the standard Beacon frame;
   in way 2, reconstructing a Sub Type field of the standard Beacon frame to form a special frame for broadcasting a load balancing request of the wireless AP, parsing, by a wireless AP receiving a reconstructed Beacon frame, the reconstructed Beacon frame and returning a load balancing response according to a structure of the reconstructed Beacon frame; wherein the load of the wireless AP is added into a Frame Body field of the load balancing response.

2. The method according to claim 1, further comprising:
   reconstructing a Frame Control field of the standard Beacon frame and determining from a type of the Frame Control field that the Beacon frame is a management frame; and
   packaging load information of the wireless AP into the Frame Body field.

3. The method according to claim 1, wherein the determining other APs for load sharing further comprises:
   for way 1, sorting, by the first AP, Beacon frames transmitted by all detectable other APs and selecting accordingly one or more APs with low loads as said other APs for load sharing;
   for way 2, sorting, by the first AP, loads corresponding to all received load balancing responses and selecting accordingly one or more APs with low loads as said other APs for load sharing.

4. The method according to claim 1, wherein when offloading the received data to said other APs, storing, by the first AP, the received data to a local cache region, packaging the received data into packets and transmitting packets to be offloaded to said other APs.

5. The method according to claim 4, when the packaging is implemented, transmitting entire data through fragmentation or as a whole.

6. A device for implementing load balancing, comprising a control module, a load calculation module, a parsing module and a transmission/reception module, wherein
   the control module is configured to control the load calculation module and the parsing module to determine whether itself is overloaded when a first AP is to transmit data received from an STA which has accessed the first AP, and to determine other APs for load sharing when determining that itself is overloaded; and
   the transmission/reception module is configured to offload the received data to said other Aps;
   wherein when determining other APs for load sharing, the control module is configured to:
   in way 1, receive Beacon frames of said other APs, control the parsing module to extract loads of said other APs in Beacon frames; or
   in way 2, broadcast a load balancing request to said other APs, receive load balancing responses by said other APs;
   wherein the control module is further configured to:
   in way 1, add a load of a wireless AP into a standard Beacon frame so as to be broadcasted by adding the load of the wireless AP into a Frame Body field of the standard Beacon frame;
   in way 2, reconstruct a Sub Type field of the standard Beacon frame to form a special frame for broadcasting a load balancing request of the wireless AP, and control the parsing module to parse a reconstructed Beacon frame after the reconstructed Beacon frame is received and return a load balancing response according to a structure of the reconstructed Beacon frame; wherein the load of the wireless AP is added into a Frame Body field of the load balancing response.

7. The device according to claim 6, wherein the control module is further configured to:
   reconstruct a Frame Control field of the standard Beacon frame and determine from a type of the Frame Control field that the Beacon frame is a management frame; and
   package load information of the wireless AP into the Frame Body field.

8. The device according to claim 6, wherein when determining said other APs for load sharing, the control module is further configured to:
   for way 1, sort Beacon frames transmitted by all detectable other APs and select accordingly one or more APs with low loads as said other APs for load sharing;
   for way 2, sort loads corresponding to all received load balancing responses and select accordingly one or more APs with low loads as said other APs for load sharing.

9. The device according to claim 6, further comprising a caching module and a packaging module, wherein
   when the received data is offloaded to said other APs, the caching module is configured to store the received data transmitted by the STA to a local cache region; and the packaging module is configured to package cached data into packets and transmit packets to be offloaded to said other APs.

10. The device according to claim 9, when the packaging is implemented, entire data is transmitted through fragmentation or as a whole.

* * * * *